Aug. 16, 1932.　　　　G. R. ERICSON　　　　1,872,430
OIL FILTER
Filed Dec. 22, 1930　　　3 Sheets-Sheet 1

GEORGE R. ERICSON
INVENTOR

BY *F. H. Gibbs*
ATTORNEY

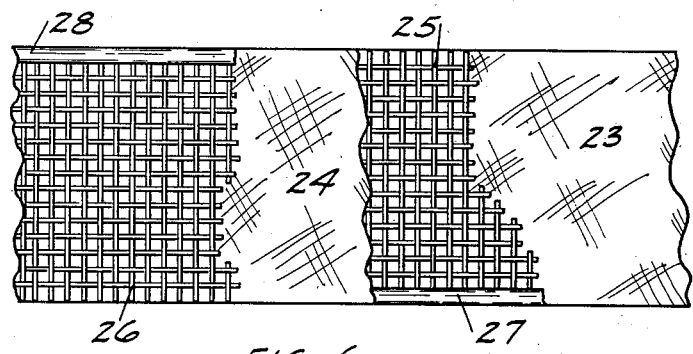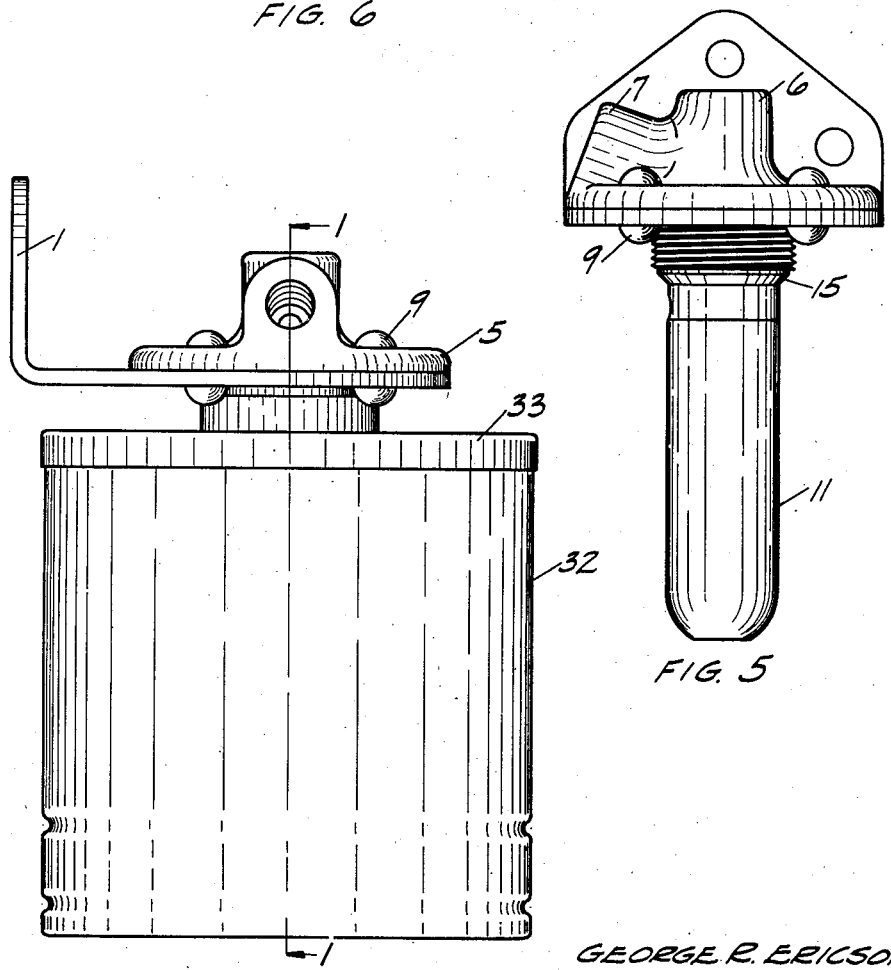

Aug. 16, 1932.  G. R. ERICSON  1,872,430
OIL FILTER
Filed Dec. 22, 1930  3 Sheets-Sheet 3

GEORGE R. ERICSON
INVENTOR
BY F. H. Libbs
ATTORNEY

Patented Aug. 16, 1932

1,872,430

UNITED STATES PATENT OFFICE

GEORGE R. ERICSON, OF MAPLEWOOD, MISSOURI, ASSIGNOR TO CARTER CARBURETOR CORPORATION, OF ST. LOUIS, MISSOURI, A CORPORATION OF DELAWARE

OIL FILTER

Application filed December 22, 1930. Serial No. 504,011.

It will be understood that the invention is susceptible of many modifications, and, accordingly, I do not wish to be limited in my protection, except as set forth in the accompanying claims.

This invention relates to filters and more particularly to oil filters for use in connection with automotive internal combustion engines.

In previous devices of this character, some difficulty has been experienced in providing an inexpensive filter of the capacity required for the filtration of the oil at a rate sufficient to keep the main body of oil in the crankcase in a clean condition. This difficulty has been chiefly due to the fact that the solid impurities in the oil are so fine as to require a filter of extremely close texture for their removal. The viscuous nature of the oil causes it to flow very slowly through a filter surface of close texture so that a very large area of surface is required if the best results are to be attained. In previous filters of this general character, in order that the filter installation may be compact enough to be carried in the small space available in the hood of an automobile, it has been necessary to compromise between a construction capable of giving the proper filtration and one which would give sufficient flow.

It is an object of this invention to produce a filter of the above described character which will be capable of filtering out the finest solid impurities in the engine oil at a rate sufficient to keep the general body of the oil in the crankcase in a clean condition.

It is a further object of the invention to produce a filter of the above described character which will have a sufficiently large filtering surface capable of filtering oil at a comparatively rapid rate and yet being of such compact nature and small size that it may be readily carried under the hood of the automobile.

It is a further object of this invention to produce a filter which will be very simple and easy to make and which may be produced to a great extent by machinery rather than by hand.

It is a further object of this invention to produce a filter installation having a filter cartridge which may readily be removed, discarded, and replaced without the use of any tools.

The invention will be better understood upon reference to the accompanying drawings in which like reference numerals refer to like parts throughout.

Figure 4 is a side elevation of the filter installation.

Figure 5 shows the other elevation of the mounting bracket, the filter cartridge being removed for clearer illustration of this bracket.

Figure 6 is a somewhat diagrammatic view showing some of the parts from which the filter cartridge is made.

Figure 3:
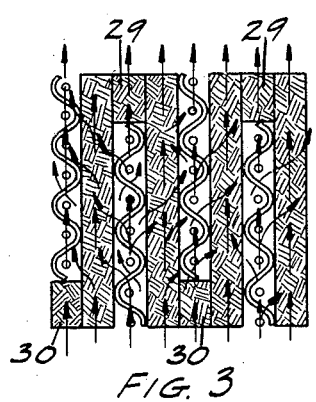
Figure 3 is a diagrammatic view showing the formation of the filter cartridge and the manner in which the oil passes through it.
Figure 2:
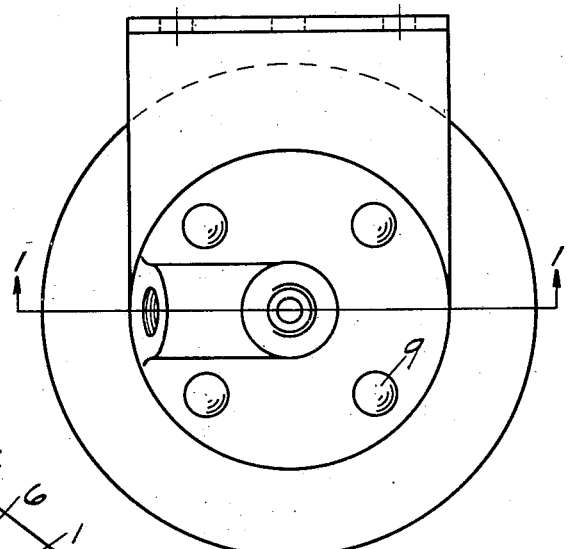
Figure 2 represents a plan view of the parts shown in Figure 1.

In the drawings like reference numerals indicate parts performing similar functions. When a reference numeral is accompanied by the letter A, it is intended to refer to a part shown in Figure 7, and where a numeral is accompanied by the letter B, it is intended to refer to a part used in the form of the invention shown in Figures 9 and 10.

The reference numeral 1 indicates a mounting bracket having suitable perforations or bolt holes 2 therein by means of which it may be attached to any convenient supporting surface. The bracket has a horizontal portion 3 in which a comparatively large perforation 4 is formed.

A casting 5, having inlet and outlet bosses 6 and 7 and a flange 8, is riveted to the bracket by means of rivets 9. This casting is provided with a portion 10 of substantially circular cross section which extends through and considerably beyond the lower surface of the longitudinal portion of the bracket, as shown in Figures 1 and 5.

Figure 1:
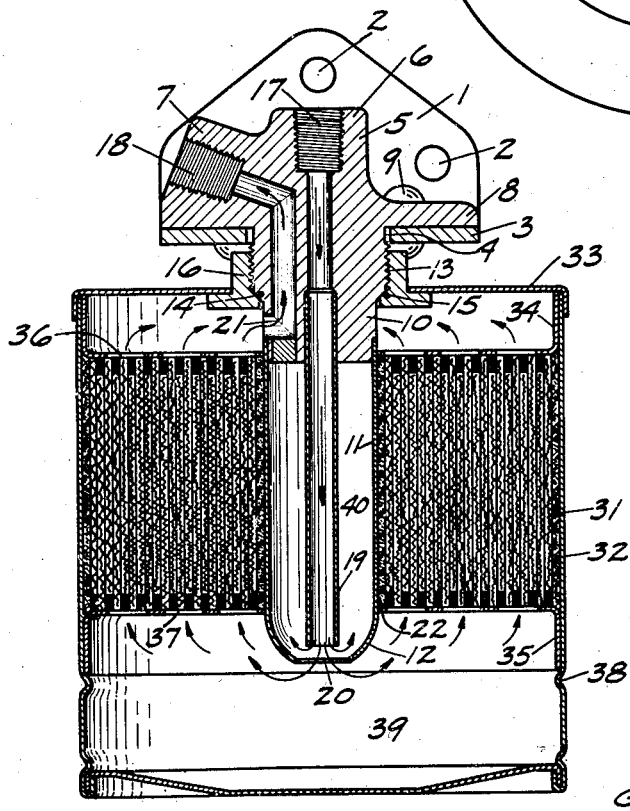
Figure 1 represents a sectional front elevation of the filter and mounting bracket. The section is taken along line 1—1 of Figure 4, looking in the direction of the arrows.

The central portion 10 carries a sleeve 11 which extends downwardly and is slightly rounded off at its lower end, as indicated at 12 in Figure 1. Preferably, the sleeve 11 has a gradual taper to a slightly smaller diameter at its lower end. The extension 10 is threaded at 13 and provided with a tapered shoulder at 14 to form a sealing joint with a corresponding shoulder 15 on the nut 16 which forms the upper part of the filter cartridge.

The inlet and outlet bosses 6 and 7 are provided with bores 17 and 18, threaded as indicated, to receive the inlet and outlet pipe connections respectively. The bore 17 has an enlarged portion in its lower end into which is fitted a tube 19 which terminates just short of the opening 20 in the lower end of the sleeve 11 for a purpose hereinafter to be described. The bore 18 is brought out at 21 in the side of the projection 10 and above the upper end of the sleeve 11.

The filter cartridge is formed by rolling the filter and spacing elements on a felt or cardboard core 22. This core is made to slidably fit the sleeve 11 so that substantially no oil will pass between the core and the sleeve. The filter elements comprise two strips of comparatively close grained filter paper 23 and 24 separated by two spacing strips of coarse filtering material or netting 25 and 26. An edging 27 and 28 is applied to the alternate edges of the spacing material so that while the oil may freely enter between the elements 23 and 24 and one edge, it can not pass clear across between the strips 23 and 24 without first passing through one of these filtering strips, after which it may continue to the other side toward the open edge of the adjacent strip of spacing material.

It will be understood that by rolling the strips 23, 25, 24, and 26 upon the core 22, a structure will be formed in the form of a roll through which oil may pass without great restriction, except during a single passage through one of the filtering strips, either 23 or 24. The oil flow in the filter cartridge is indicated by the arrows in Figures 1 and 3. It should be noted that in Figure 3, the edging members 29 and 30 are formed of fine filtering material so that a certain amount of oil can pass sideways through these members without passing through the strips 23 or 24.

The outside of the roll is covered by a felt or flannel covering 31 which is tied or cemented in place so that the cartridge may be slipped into the can 32 before the cover 33 is attached to the can. It will be understood that the soft and flexible covering 31 is to fill up any crevices between the outside of the roll and the can or housing.

Suitable sheet metal spacers 34 and 35 are located on the inside of the can to hold the filter in place. These spacers are perforated as indicated at 36 and 37 so that the oil may freely pass into or out of the filter. The lower spacer 35 is held in position by a rib 38 or other suitable means, and a settling chamber 39 of substantial capacity is located below the lower end of the filter so that any large particles of dirt or water may settle out without passing into the filtering surfaces. The life of the filter is substantially prolonged in this manner. If desired, a drain cock may be provided at the lower part of the settling chamber.

The chamber 39 is preferably filled with some loose packing material such as metal shavings, sawdust, or charcoal for the purpose of preventing the surging of the oil in the bottom of the settling chamber while the vehicle is in motion. I also contemplate the use of baffle plates for the same purpose.

It will be understood that a chamber 40 is formed between the tube 19 and the sleeve 11. This chamber is closed, except at the lower end, and forms an air chamber for the purpose of taking up sudden pulsations in the flow of oil, such as might damage the filter. The use of the cushioning chamber also tends to deaden the sound of the oil pump.

It will be understood that this feature may be omitted, if desired, in which case the core 22 will fit on the outside of the tube 19 instead of on the outside of the sleeve 11, the sleeve being omitted. In that case, the extension 10 would be slightly shortened, and the outlet conduit 18—21 could have its inlet end in a horizontal plane just above the upper end of the filter roll.

Figure 8:
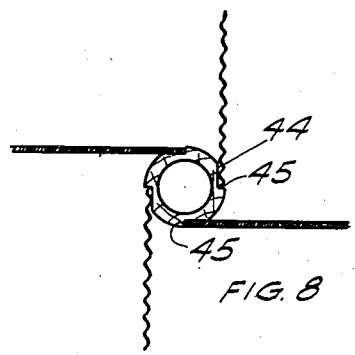
Figure 8 is an end view of a modified form of core showing an arrangement for conveniently starting the roll of filter elements without forming large crevices which would permit leakage.
Figure 7:
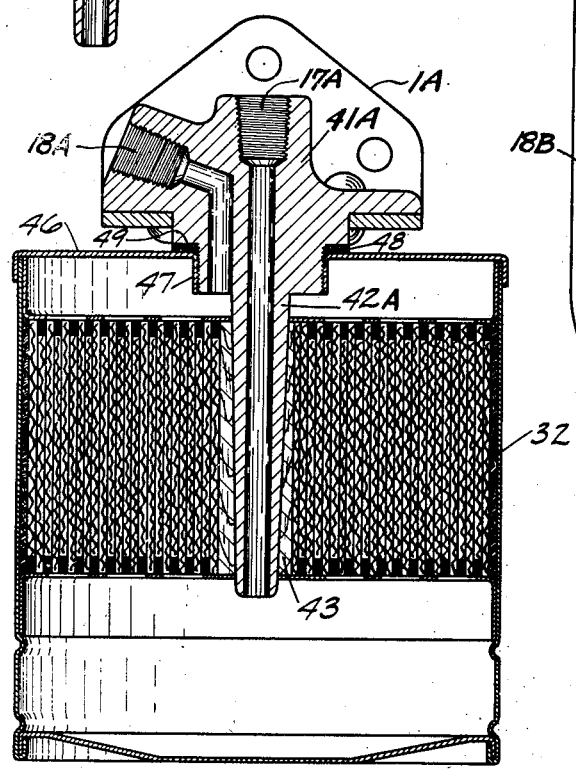
Figure 7 is a sectional elevation showing a slightly modified form of filtering device in which the cushioning chamber 40 is omitted.

This form of construction is shown in Figures 7 and 8 in which the casting 41A and the tube 19 are integral, a projection 42A on the casting taking the place of the tube 19. This projection is preferably given a slight taper toward its outer end so that the core member 43 may fit more snugly. In this form of device, I prefer to use a wooden core and to cut longitudinal grooves on its outer surface, as shown in Figure 8. The groove comprises a tangential portion 44 and a radial portion 45. There being four strips of the filter elements to be rolled on to the core, the end of each strip is butted up against the radial portion of a groove, as shown in Figure 8, so that the rolling may proceed evenly and smoothly without the necessity for any filter element abruptly passing over the square butt end of another element which would result in leakages through the filter.

The inlet and outlet passages in Figure 7 are indicated respectively by the reference characters 17A and 18A. The outlet passage 18A is formed in two parts at an angle to each other, as indicated.

In the construction shown in Figure 7, the cover 46 of the filter cartridge is turned inwardly at 47 so that it may be screw threaded directly on to the casting 41A, thus avoiding the necessity for using the nut 16, as shown in Figure 1. In this case, a suitable gasket 48 is provided to form a seal between the cover 46 and shoulder 49 on the casting 41A.

Figure 9:
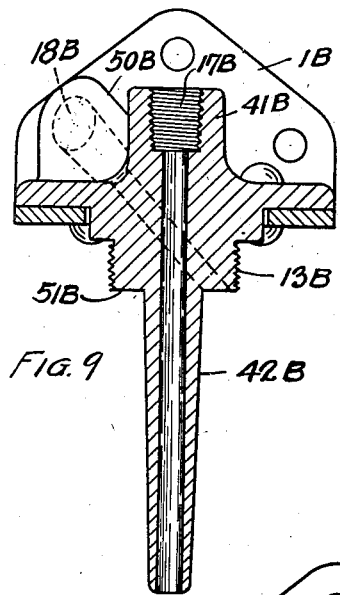
Figure 9 shows a sectional elevation of a slightly modified form of a filter mounting bracket and core.
Figure 10:
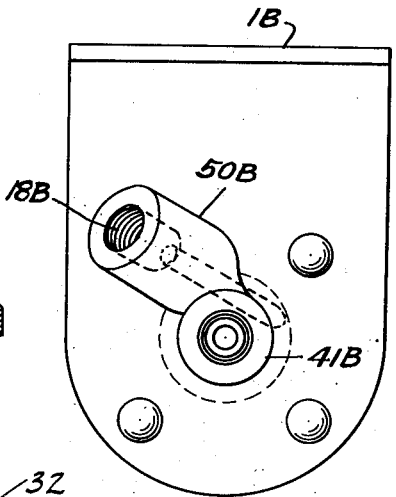
Figure 10 shows a plan view of the parts shown in Figure 9.

The device shown in Figure 9 is substantially the same in operation as that shown in Figure 7, but is a more convenient design to manufacture under some conditions on account of the fact that the outlet passageway and the threads for the outlet connection are formed on a single axis so that the drilling and tapping of this passageway may be performed in a single operation.

It will be understood that the most convenient location for the passageway 17, is in the center of the threaded portion 13. By this arrangement, the greatest convenience in machining this passagaway and the outer portion of the projection 42 is obtainable. It is also highly desirable to keep the thread diameter of the threads 13 as small as possible so that the filter may be screwed tightly into position by hand, which could not be done if the thread diameter was large in comparison with the diameter of the casing 32. It would accordingly be impossible to make the passages 17 and 18 parallel without unduly increasing the thread diameter 13, or else getting the threaded portions of the passageways so close together that it would be inconvenient to manipulate the inlet and outlet connections.

In the construction shown in Figures 9 ad 10, I have formed the outlet passageway 18B in a boss 50B, which is arranged with its axis in a different plane from the axis of the passage 17B and also at an angle thereto. It will be seen from Figures 9 and 10 that the axes of the passages 17B and 18B approach more closely together in or near the threaded portion 13B than anywhere else. By this arrangement the inner end of the outlet passageway terminates in the shoulder 51B at the lower end of the thread 13B.

It will be seen from the above that the smallest possible diameter of the thread 13B may be obtained in this manner without incurring the necessity of forming the outlet passageway in two parts at an angle to each other, as is done in Figures 1 and 7.

In operation, an inlet connection is made to the conduit 17, and an outlet connection is made to the conduit 18, and the oil to be filtered is forced into the settling chamber 39 through the tube 19 by any suitable pressure device, such as the oil pump of the engine.

The oil is passed through the filter, as indicated in Figures 1 and 3, and the clean oil is discharged through the conduit 21—18. The oil discharged may be led either direct to the crankcase, to bearings which are to be lubricated, or to some device for further refining the oil as, for instance, a device for distilling off any lighter hydrocarbons which may have become mixed with the oil during the operation of the engine.

It will be understood that the viscosity of the oil may be reduced and the rate of flow through the filter may be increased by placing it adjacent the exhaust manifold or some other part of the engine having a fairly high temperature. It is not desirable to mount the device directly on the exhaust pipe, unless an asbestos filter is used, as the preferred paper filter would become charred and useless, owing to the high temperature.

I claim:

1. A filter cartridge comprising a roll of filtering material wound on a core, said core having a longitudinal bore therethrough concentric with said roll, a housing surrounding said roll of filtering material, one end of said housing being closed and the other end of said housing having a single circular opening, said circular opening being concentric with said roll and said core the diameter of said opening being substantially smaller than the diameter of said core.

2. A filter cartridge comprising a roll of filtering material wound on a core, said core having a tapered opening therethrough concentric with said roll of material, a housing for said roll, said housing being in liquid tight contact with the periphery of said roll, one end of said housing being completely closed, the other end of said housing being provided with a partial closure, said partial closure comprising a circular covering having an opening in the center thereof.

3. In a device of the class described, a filter core having four longitudinal grooves in the outer surface thereof, a pair of strips of filtering material having their ends abutting corresponding sides of two opposite grooves, a pair of strips of spacing material each having an end abutting a corresponding side of opposite longitudinal grooves, the strips of spacing and filtering material being of substantial length and being wound on the said core into the form of a substantially cylindrical cartridge.

4. In a device of the class described, a filter core having a longitudinal bore therein, a plurality of oppositely disposed longitudinally extending grooves in the outer surface of said core, a plurality of strips of filtering material each having an end located in one of said grooves, said strips being of substantial length and being wound into a roll about said core.

5. In a device of the class described, a filter core having a longitudinal bore therein, a plurality of longitudinally extending grooves in the outer surface of said core, a plurality of strips of filtering material each having an end located in one of said grooves, said strips being of substantial length and being wound in a substantially cylindrical roll about said core, said roll having an outer binding of soft and flexible material, a sheet metal housing closely surrounding said roll, the flexibility of said binding permitting it to substantially seal any grooves between the housing and the roll due to irregularities caused by the termination of the outer ends of said strips.

6. In a device of the class described, a filter housing containing a filter, said housing being sealed except for an opening of smaller diameter than said filter, a mounting bracket having an extension adapted to fit into said opening, a core for said filter havinb a passageway therethrough, a conduit on said extension extending into said passageway and a second conduit passing through said extension at an angle to the first named conduit, one of said conduits serving as an inlet passageway and the other serving as an outlet passageway.

In witness whereof I have hereunto set my hand.

GEORGE R. ERICSON.